(12) United States Patent
Katrak et al.

(10) Patent No.: US 10,498,548 B2
(45) Date of Patent: Dec. 3, 2019

(54) METHOD, APPARATUS, AND COMPUTER PROGRAM PRODUCT FOR A SCALABLE GROUP-BASED COMMUNICATION SYSTEM WITH A REDUCED CLIENT MEMORY FOOTPRINT REQUIREMENT

(71) Applicant: SLACK TECHNOLOGIES, INC., San Francisco, CA (US)

(72) Inventors: Cyrus Katrak, San Francisco, CA (US); Mark Christian, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 15/983,674

(22) Filed: May 18, 2018

(65) Prior Publication Data

US 2018/0337795 A1  Nov. 22, 2018

Related U.S. Application Data

(60) Provisional application No. 62/508,952, filed on May 19, 2017.

(51) Int. Cl.
*H04L 12/18* (2006.01)
*H04L 29/06* (2006.01)
(Continued)

(52) U.S. Cl.
CPC ........ *H04L 12/1818* (2013.01); *H04L 12/189* (2013.01); *H04L 12/1813* (2013.01); *H04L 12/5691* (2013.01); *H04L 47/70* (2013.01); *H04L 63/0807* (2013.01); *H04L 63/0853* (2013.01); *H04L 63/102* (2013.01); *H04L 63/104* (2013.01); *H04L 63/12* (2013.01);
(Continued)

(58) Field of Classification Search
CPC .............. H04L 12/189; H04L 12/5691; H04L 67/1002; H04L 67/1004; H04L 67/1044; H04L 67/104; H04L 47/70; H04L 63/10–108; H04L 63/12; H04L 63/0807; H04L 63/0853; H04L 2012/6445; H04L 29/06823–0685; H04L 29/08144; H04W 4/08; H04W 88/16
See application file for complete search history.

(56) References Cited

U.S. PATENT DOCUMENTS 8,929,257 B1 * 1/2015 Goepp ................ H04L 65/1076
370/260
8,970,660 B1 * 3/2015 Rudkowski ......... H04L 65/1076
348/14.09

(Continued)

OTHER PUBLICATIONS

G. Almasi et al., "Functional Specifications for Collaboration Services", Proceedings of 3rd IEEE Workshop on Enabling Technologies: Infrastructure for Collaborative Enterprises, pp. 225-238, 1994. (Year: 1994).*

(Continued)

*Primary Examiner* — Joshua Kading
(74) *Attorney, Agent, or Firm* — Alston & Bird LLP

(57) ABSTRACT

Various embodiments are directed to systems and methods for efficient network distribution of group-based communication data transmissions comprising group-based communication data required by client devices within a group-based communication platform.

18 Claims, 15 Drawing Sheets

(51) Int. Cl.
*H04L 29/08* (2006.01)
*H04L 12/911* (2013.01)
*H04W 4/08* (2009.01)
*H04L 12/54* (2013.01)
*H04W 88/16* (2009.01)

(52) U.S. Cl.
CPC ...... *H04L 65/1023* (2013.01); *H04L 65/1069* (2013.01); *H04L 67/1004* (2013.01); *H04L 67/1044* (2013.01); *H04W 4/08* (2013.01); *H04W 88/16* (2013.01)

(56) References Cited

U.S. PATENT DOCUMENTS

| | | | | |
|---|---|---|---|---|
| 2007/0143827 | A1* | 6/2007 | Nicodemus | G06F 21/6218 726/2 |
| 2012/0147127 | A1* | 6/2012 | Satterlee | H04N 7/152 348/14.08 |
| 2016/0165006 | A1* | 6/2016 | Fitzpatrick | H04L 67/1008 709/217 |
| 2016/0295163 | A1* | 10/2016 | Shiro | H04L 65/1069 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.text>. (dated May 1993) 66 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
U.S. Appl. No. 15/963,636, filed Apr. 26, 2018, In re: Largman et al. entitled Automated Load Distribution for a Group-Based Communication Platform, U.S. Appl. No. 15/963,636.
Matsumoto, T. et al., "Chocoa Communicator—A New Communication System Based on Awareness and Text Communications—", Fujitsu Sci. Tech. J., 36, 2, (Dec. 2000) 154-161.

\* cited by examiner

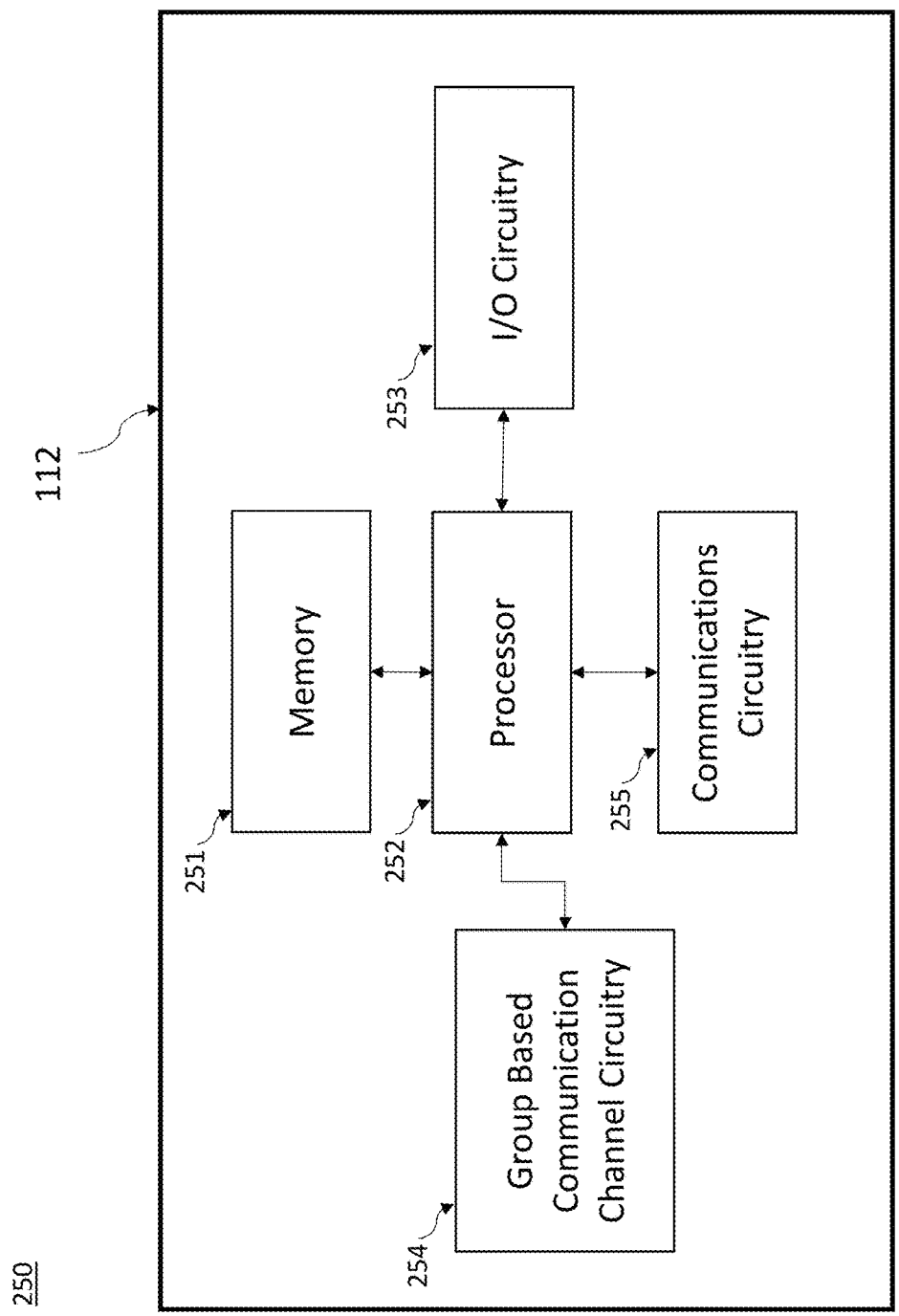

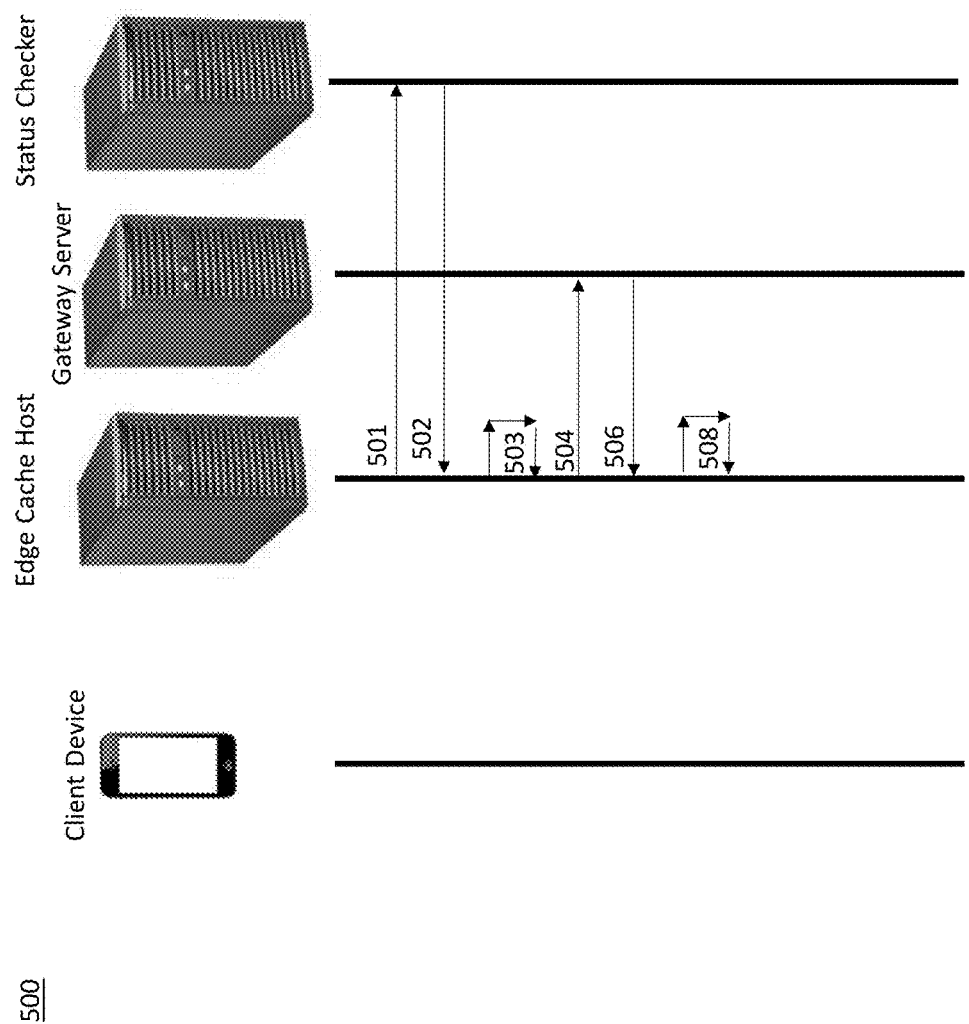

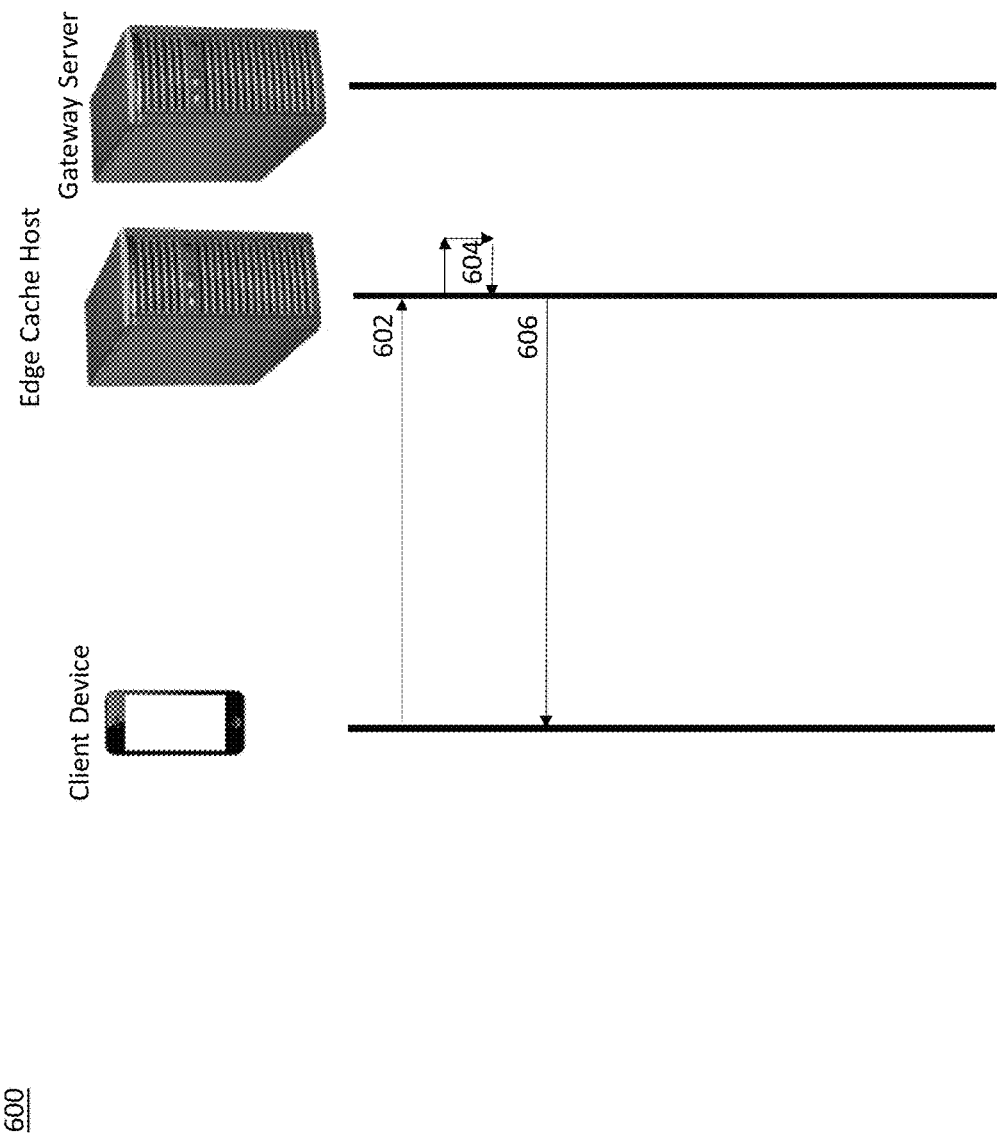

METHOD, APPARATUS, AND COMPUTER PROGRAM PRODUCT FOR A SCALABLE GROUP-BASED COMMUNICATION SYSTEM WITH A REDUCED CLIENT MEMORY FOOTPRINT REQUIREMENT

The present application claims the benefit of priority to U.S. Provisional Patent Application Ser. No. 62/508,952, titled "METHOD, APPARATUS, AND COMPUTER PROGRAM PRODUCT FOR A SCALABLE GROUP-BASED COMMUNICATION SYSTEM WITH A REDUCED CLIENT MEMORY FOOTPRINT REQUIREMENT," filed May 19, 2017, the contents of which are incorporated by reference herein in their entirety.

BACKGROUND

Systems have been provided for supporting communication and collaboration among a plurality of client devices. Applicant has identified a number of deficiencies and problems associated with scalability and efficiency of such communication and collaboration tools. Through applied effort, ingenuity, and innovation, many of these identified problems have been solved by developing solutions that are included in embodiments of the present invention, many examples of which are described in detail herein.

BRIEF SUMMARY

This specification relates to a highly scalable group-based communications system, where a client device memory footprint is reduced in addition to a load on a group-based communication server and other communication and/or group-based communication data supporting servers. According to embodiments, group-based communication edge cache hosts are deployed in geolocations remote to group-based communication servers and group-based communication repositories. Upon initialization of a group-based communication interface at a client device, the group-based communication edge cache host servers retrieve and cache relevant group-based communication data associated with group-based communication system users, channels, bots, and the like, where the group-based communication data retrieved is associated with a user profile associated with the client device. The group-based communication edge host server then provides query APIs for the client devices to fetch additional group-based communication data upon demand. The group-based communication edge host server also foresees group-based communication data that will be required and used by client devices in a predictive and preemptive manner, retrieves the group-based communication data, and pushes the group-based communication data proactively to client devices. For example, when a user of a client device enters information related to a fellow user of a group-based communication channel in a chat message in the group-based communication channel, while broadcasting that chat message to other users in the group-based communication channel, the group-based communication edge host server recognizes group-based communication data that has not been loaded by clients (e.g., information about the mentioned user) recently, thus may not have the data at all. The group-based communication edge host server sends the data to those clients just before sending the chat message to save them a round-trip query.

Various embodiments relate generally to systems and methods for automatically distributing, allocating, and/or directing data-based loads generated to support message exchanges between client devices operable via a group-based communication platform. Groups of individual client devices (e.g., groups exchanging content on a group-based communication channel operating via the group-based communication platform) are supported by one or more group-based communication edge cache host servers, one or more gateway servers—the one or more gateway servers being embodied as a subset of available gateway servers (the initial subset being a first subset of the plurality of available gateway servers) and one or more channel servers (of a plurality of channel servers). Communications exchanged within the group (e.g., generated by a first client device and disseminated to other client devices within the group) are transmitted to each of the one or more group-based communication edge cache host servers, and to the one or more gateway servers supporting the group and from the gateway servers to a target channel server supporting the group. The communications are also disseminated from the plurality of gateway servers to the client devices associated with other members of the group.

Messages shared within a group comprise metadata utilized to direct messages for dissemination within an appropriate group. The metadata may comprise both a user identifier (e.g., identifying the user who generated the message), as well as a group and/or channel identifier to direct the message to the appropriate group. Messages may first pass through an interface controller after transmission from the client device, and the interface controller may direct the message to the appropriate gateway servers for dissemination to client devices within the group based on the content of metadata transmitted with the message content. Moreover, the gateway servers are configured to transmit the message to an appropriate channel server based at least in part on data stored within a configuration key generated by one or more admin servers. The channel servers store the message within a database for indexing and/or storage.

The gateway servers may be configured to reference the configuration key generated by the admin servers to match groups and/or channels with respective channel servers. The configuration key may be generated and/or maintained by the admin servers (the plurality of admin servers operating in the alternative to update the configuration key) based at least in part on health data provided by a status checker configured to monitor the health of the plurality of channel servers and/or admin servers (e.g., based on data transmissions provided between the servers (channel servers and/or admin servers) and the status checker), and upon detecting that one or more of the channel servers are exhibiting failing health characteristics, the admin servers may automatically update the configuration key to reallocate data loads (e.g., generated based at least in part on communications within a group-based communication channel) transmitted through the failing channel servers to other channel servers determined to be operating normally.

The updated configuration key may be accessible to the admin servers and/or the gateway servers (e.g., retrievable from memory storage in association with the status checker and/or transmitted to one or more of the admin servers and/or gateway servers). Based at least in part on the content of the updated configuration key, the gateway servers route messages to appropriate channel servers in accordance with the updated configuration key. Thus, the channel server servicing a particular group of client devices (through the one or more gateway servers) may change in the event that one or more of the channel servers initially supporting the group is determined to be failing by the status checker. In that instance, a failing channel server may be substituted for a different channel server (e.g., a spare channel server). Users communicating via a group-based communication platform (e.g. a cloud-based group collaboration tool provided by SLACK®) that is structured in accordance with various embodiments of the invention thus experience minimal service interruption when one of the channel servers malfunctions.

Various embodiments of the present disclosure are directed to apparatuses for efficient network distribution of group-based communication data requests and transmissions. In embodiments, the apparatuses comprise a processor and a memory storing instructions executable by the processor to cause or configure the apparatus to perform various functions. In embodiments, those functions comprise receiving, from a group-based communication load balancer, a client device connection request. In embodiments, the client device connection request is associated with a client device and comprises a client device authorization token.

In embodiments, the functions further comprise transmitting, to a group-based communication server in communication with a group-based communication repository, the client device authorization token.

In embodiments, the functions further comprise receiving, from the group-based communication server upon the group-based communication server verifying the client device authorization token, a first group-based communication data superset associated with the client device authorization token.

In embodiments, the functions further comprise storing, in at least one memory, the first group-based communication data superset.

In embodiments, the functions further comprise extracting a first group-based communication data subset from the first group-based communication data superset. In embodiments, the first group-based communication data subset comprises a first group-based communication minimum data set required by the client device to render a group-based communication interface.

In embodiments, the functions further comprise transmitting the first group-based communication minimum data set to the client device.

In embodiments, the functions further comprise receiving, using the processor and from a group-based communication status checker, data representing a plurality of available group-based communication gateway servers.

In embodiments, the functions further comprise establishing, using the processor, a connection with a group-based communication gateway server of the plurality of available group-based communication gateway servers.

In embodiments, the functions further comprise receiving, using the processor and from the group-based communication gateway server, an updated group-based communication data set associated with the client device.

In embodiments, the functions further comprise updating, using the processor and in the at least one memory, the first group-based communication data superset with the updated group-based communication data set to produce an updated first group-based communication data superset.

In embodiments, the functions further comprise receiving, using the processor and from the client device, a group-based communication data request.

In embodiments, the functions further comprise extracting, using the processor and from the updated first group-based communication data superset, a second group-based communication data subset based on the group-based communication data request.

In embodiments, the functions further comprise transmitting, using the processor, the second group-based communication data subset to the client device.

In embodiments, the second group-based communication data subset is different from the first group-based communication data subset.

In embodiments, the functions further comprise selecting, using the processor, the group-based communication gateway server from the plurality of available group-based communication gateway servers based upon a group-based communication team identifier associated with the client device.

In embodiments, the apparatus is located in a different geolocation than both the group-based communication gateway server and the group-based communication server.

In embodiments, the first group-based communication data superset comprises all group-based communication data stored in the group-based communication repository associated with the client device.

In embodiments, all group-based communication data stored in the group-based communication repository associated with the client device comprises group-based communication channel data associated with one or more group-based communication channel identifiers associated with the client device, group-based communication team data associated with one or more group-based communication team identifiers associated with the client device, and group-based communication channel member data associated with one or more members included in those group-based communication channels identified by the group-based communication channel identifiers associated with the client device.

In embodiments, the group-based communication server retrieves the first group-based communication data superset from a group-based communication repository.

Group-based communication interfaces within a group-based communication platform are required to be a consistent, compact and searchable replica of group-based communication platform users, files, messages, custom emojis, bots, sound effects, and the like, that a group-based communication team is sharing in real time. As such, a group-based communication interface initializes with a wealth of information designed to expedite immediate use.

The inventors of the present disclosure have identified that the computing resources required for initializations of group-based communication interfaces are easily exhausted as the size of group-based communication teams grow (e.g., teams get especially large and the number of channels, users and bots become unwieldy. Group-based communication interface startup time and client device memory footprint overhead both suffer as a result.

Those users that are part of group-based communication teams larger than tens of thousands of users may experience:
  Connection time becomes too long: Users experience wait times of seconds and up to minutes on the loading screen. When switching among group-based communication channels, it takes a long time to show the first handful of messages.
  Client device memory footprint becomes large: Too much data are stored at client side, which results in poor performance because of the memory required.
  Reconnection to the group-based communication server is computationally and resource expensive: If a connection is lost, each restart process is almost as resource-intensive as the first one. But we want you to be able to close your laptop, and immediately get back to work when you reopen it.

Reconnection storms are resource intensive: When an entire office or group-based communication organization loses network connection or otherwise needs to connect at once, each of them transmits a storm of requests to the group-based communication server, causing cascading server problems manifested as slower connections, more reconnects, more failures and more retries.

Embodiments of the present disclosure provide a reduced client memory footprint as well as a reduced group-based communication interface initialization time. Embodiments of the present disclosure also provide group-based communication edge cache hosts that are geographically distributed across the globe in different geolocations than group-based communication servers. The group-based communication edge cache hosts provide lower latency associated with client device requests as well as a reduction in network traffic because the group-based communication edge cache hosts reduce the number of requests transmitted to group-based communication servers.

Embodiments of the present disclosure enable amortization of fetches of group-based communication data over time. For example, as opposed to long, computationally intense periods of group-based communication data fetching upon startup, the present embodiments enable brief, light moments of group-based communication data fetching across the duration of a group-based communication interface session. Such amortization provides easier understanding of data service capacity management and lessens a group-based communication platform's risk of outages due to reconnect storms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
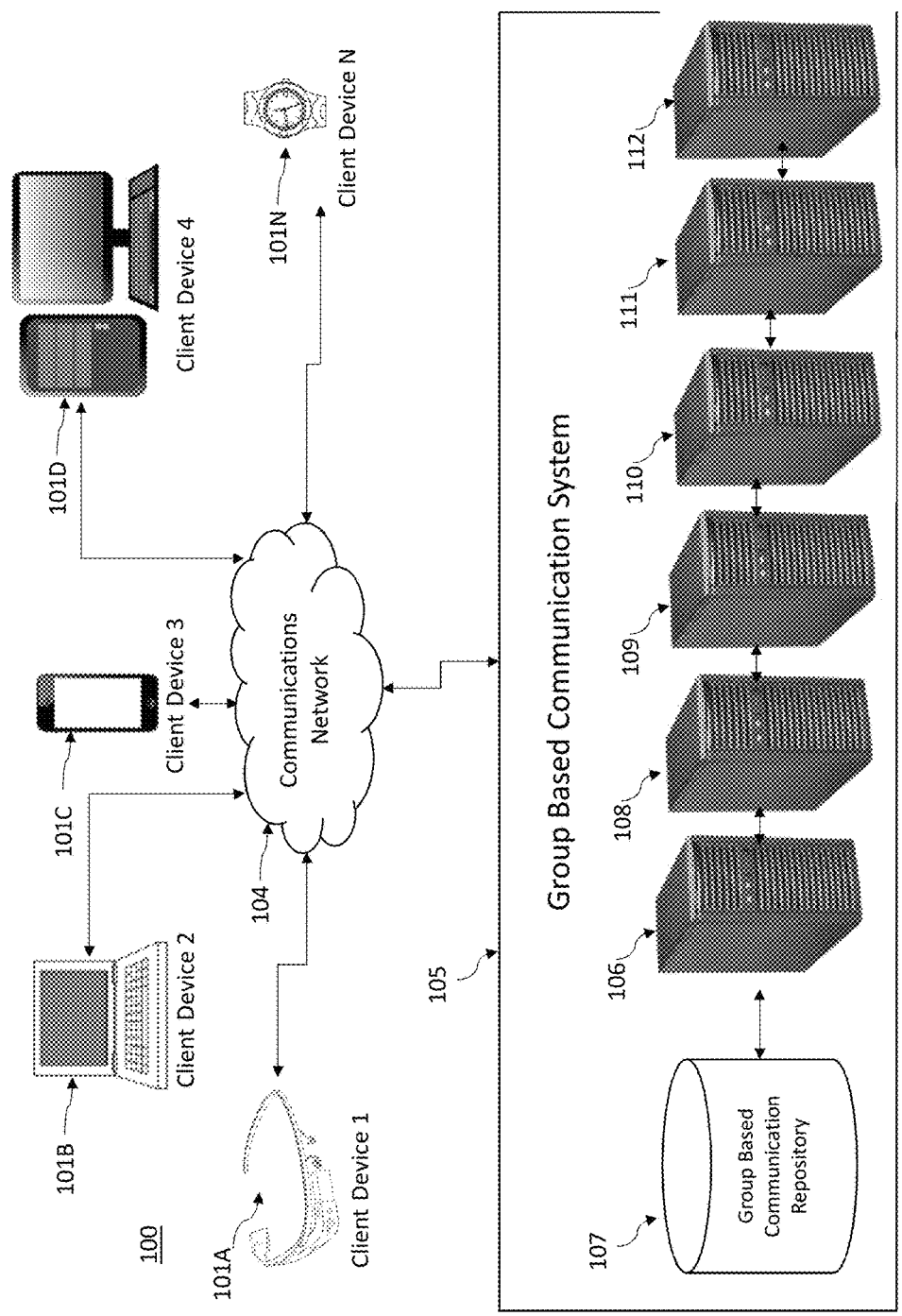
Figure 3A:
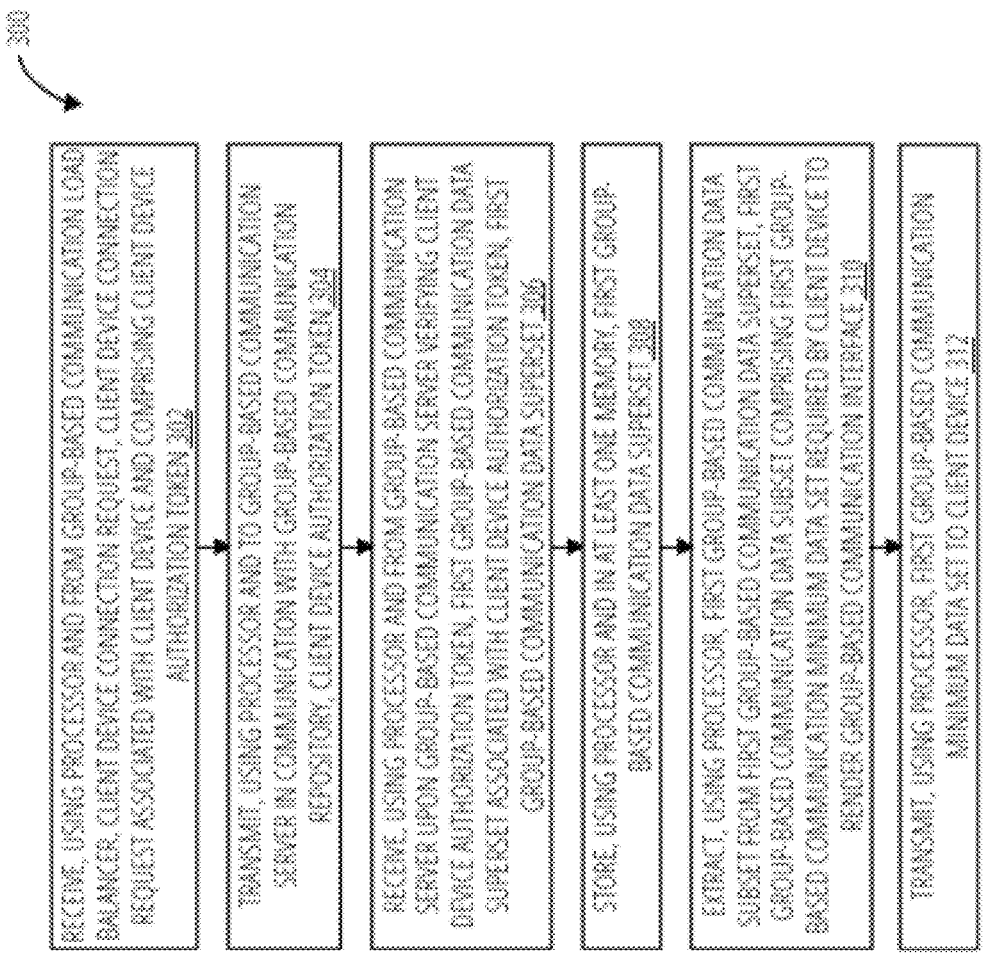
Figure 3B:
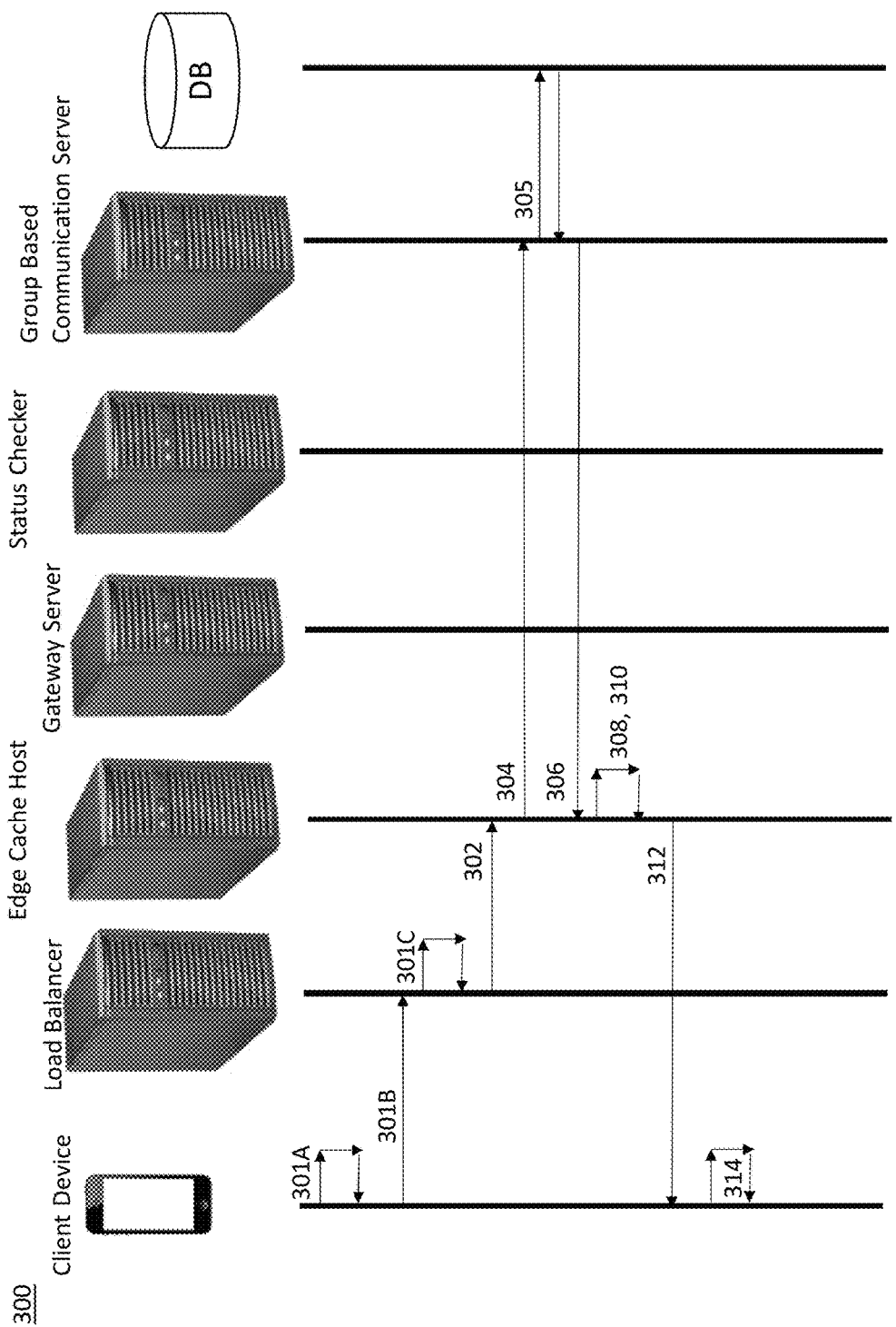
Figure 4A:
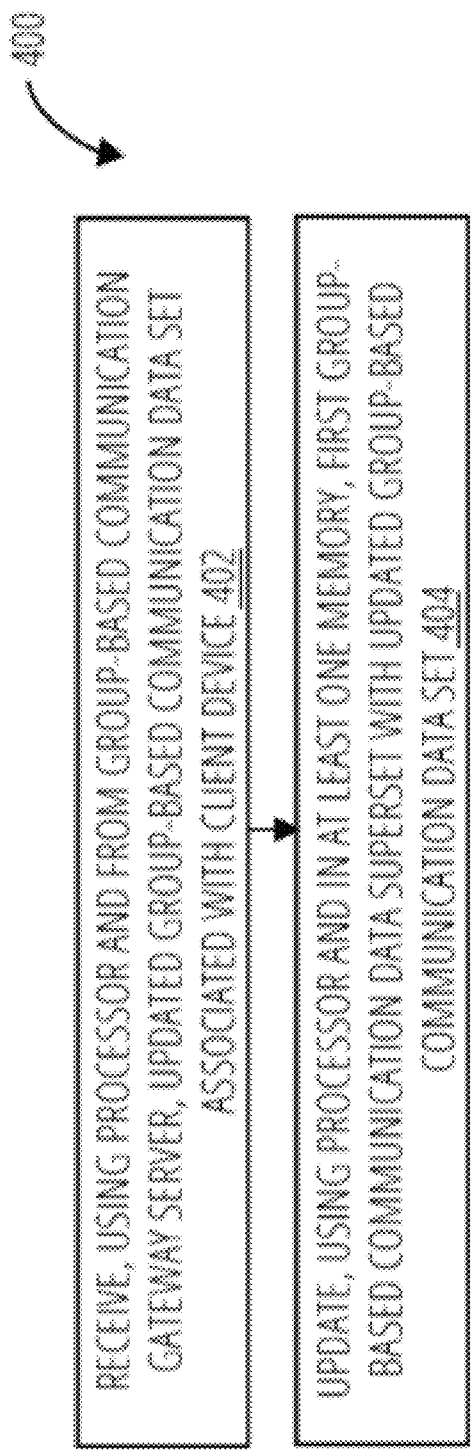
Figure 4B:
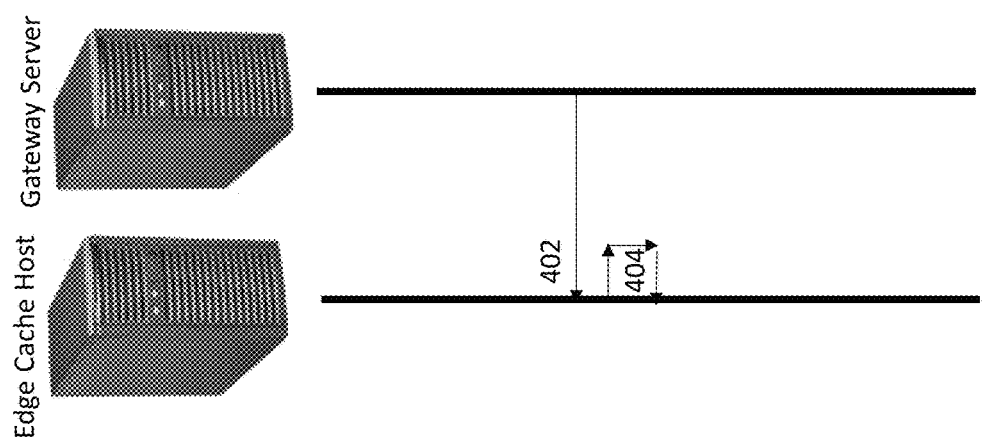
Figure 5A:
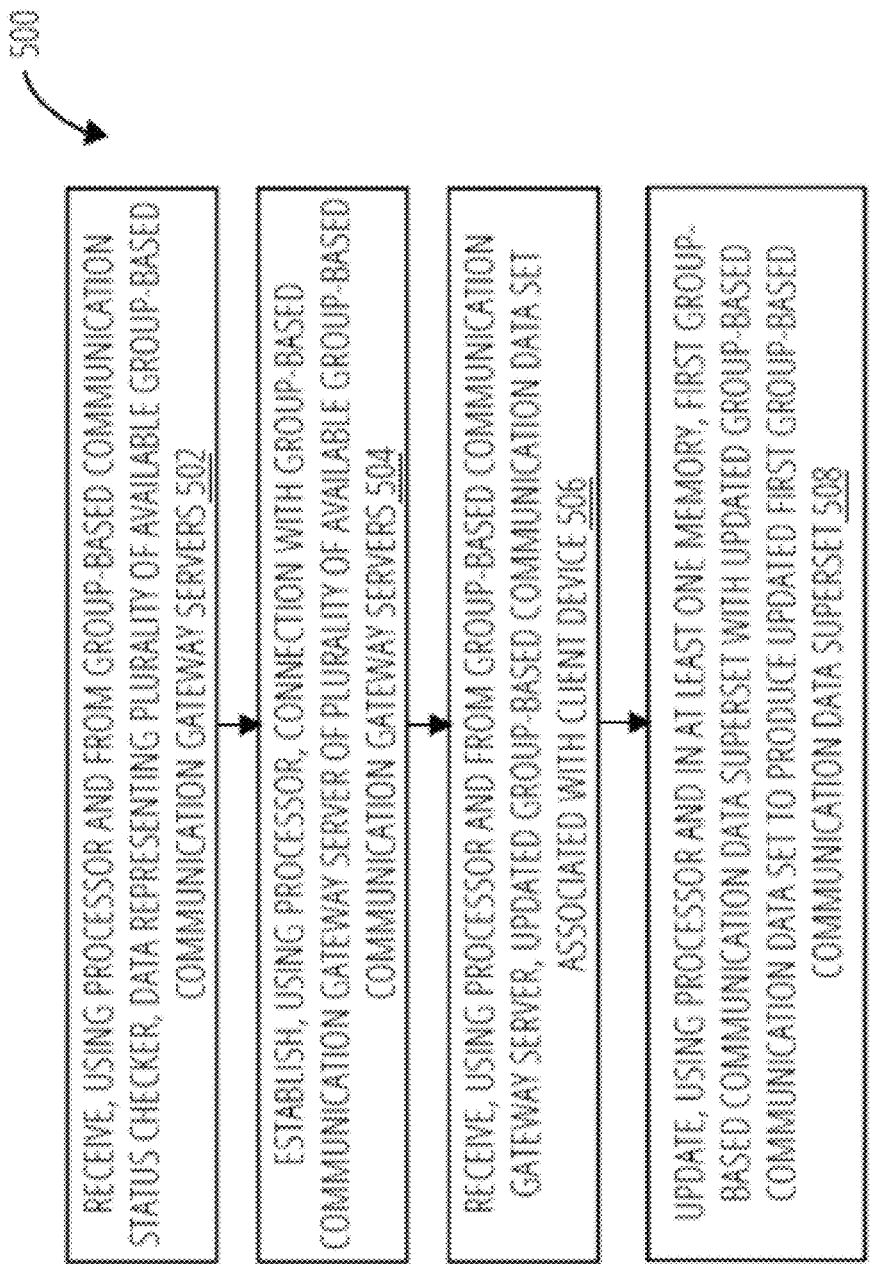
Figure 6A:
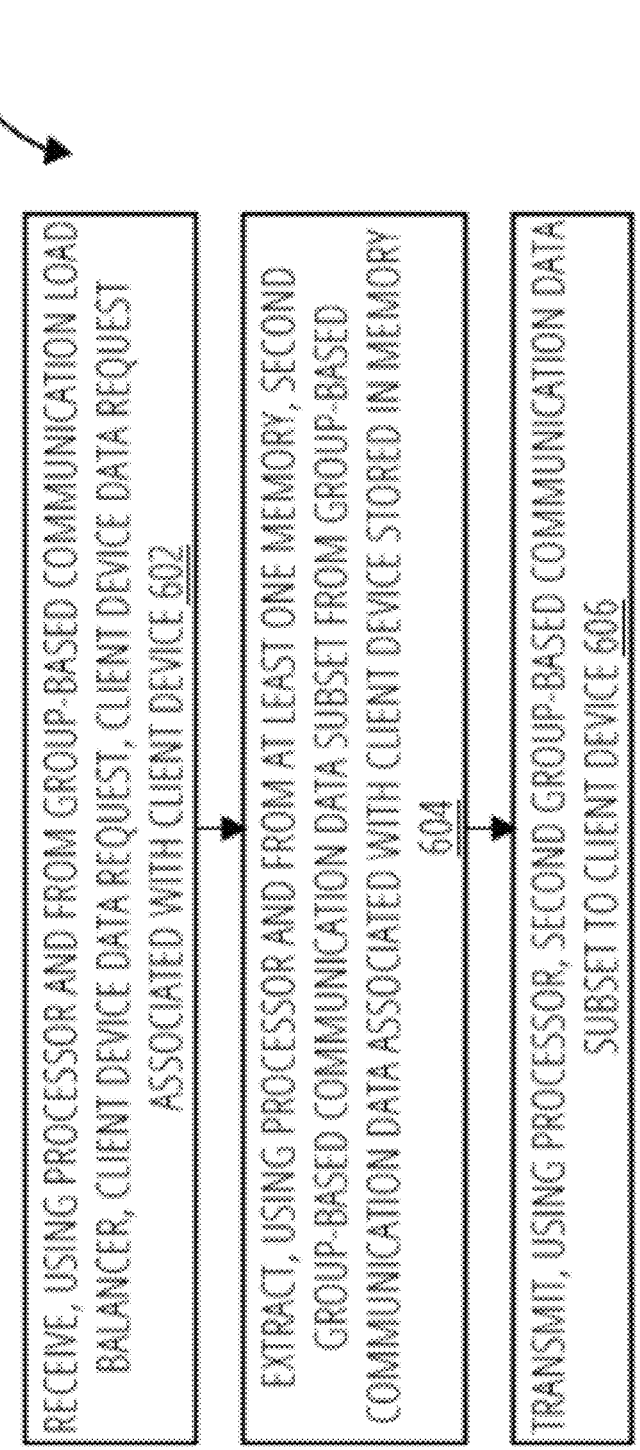

Having thus described the invention in general terms, reference will now be made to the accompanying drawings, which are not necessarily drawn to scale, and wherein:

FIG. 1 is a system architecture diagram of a group based communication system configured to practice embodiments of the present disclosure;

FIGS. 2A-2F are exemplary schematic diagrams of computing entities according to embodiments of the present disclosure;

FIGS. 3A and 3B illustrate an exemplary data flow according to one embodiment of the present disclosure;

FIGS. 4A and 4B illustrate an exemplary data flow according to one embodiment of the present disclosure;

FIGS. 5A and 5B illustrate an exemplary data flow according to one embodiment of the present disclosure; and FIGS. 6A and 6B illustrate an exemplary data flow according to one embodiment of the present disclosure.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Various embodiments of the invention generally relate to scalability of group-based communications channels within a group based communication platform, where a client memory footprint is reduced in addition to a load on a group based communication server. Embodiments of the present disclosure enable efficient network distribution of group-based communication data requests and transmissions.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like; the users referred to herein are accessing a group-based communication or messaging system using client devices. "Group-based" is used herein to refer to system, channel, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user.

The terms "user profile," "user account," and "user account details" refer to information associated with a user, including, for example, a user identifier, one or more group-based communication channel identifiers associated with group-based communication channels that the user has been granted access to, one or more group-based communication group or team identifiers for groups or teams with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, and the like. The user account details can include a subset designation of user credentials, such as, for example, login information for the user including the user's username and password.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the channel; however, the content of the group-based communication channel (i.e., messaging communications) will be displayed to each member of the channel. For instance, a common set of group-based messaging communications will be displayed to each member of the respective group-based communication channel such that the content of the group-based communication channel (i.e., messaging communications) will not vary per member of the channel. As used herein, the terms "messaging communication" and "message" refer to any electronically generated digital content object provided by a user using a client device and that is configured for display within a group-based communication channel. Communications may include any text, image, video, audio or combination thereof provided by a user (using a client device). For instance, the user may provide a messaging communication that includes text as well as an image and a video within the messaging communication. In such a case, the text, image, and video would comprise the messaging communication or digital content object.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Messages for display within a group-based communication channel interface are "replicated" across devices within the group-based communication channel, including client devices, gateway servers, and/or channel servers. Replication causes copies of at least a portion of each message (including message content and/or attachments) to be created in memories associated with each of the devices associated with a group-based communication channel. The replicated copies may be generated by transmitting the message (e.g., copies of the message) from a single device (e.g., a single client device and/or a single interface controller) to a plurality of devices (e.g., a plurality of client devices and/or a plurality of gateway servers). However, it should be understood that messages may be replicated by transmitting a message from a single device to a separate, single device, and this process may be repeated one or more times to replicate a message among a plurality of devices. In certain embodiments, message replication among a plurality of gateway servers and a single channel server enables messages to be shared with client devices within a common group-based communication channel that spans a plurality of gateway servers (e.g., each client device may communicate with a separate gateway server) and is supported by the single channel server. However, it should be understood that certain embodiments support channels via a single gateway server, and accordingly the single gateway server disseminates messages to the appropriate client devices in such configurations.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system or platform users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication organization identifier" refers to one or more items of data by which an organization within a group-based communication system may be identified. For example, a group-based communication organization identifier" may comprise ASCII text, a pointer, a memory address, and the like.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Group-based communication gateway servers" or "gateway servers" as discussed herein with reference to certain embodiments are geographically distributed computing devices configured for interacting with various client devices through a group-based communication edge cache host server for receiving and/or disseminating messages for distribution within a group-based communication platform. Gateway servers may operate alone to support group-based communication channels (i.e., a single gateway server supports a group-based communication channel). In certain embodiments, gateway servers operate within defined subsets of a plurality of gateway servers (e.g., each defined subset encompassing greater than one gateway server and less than a total number of available gateway servers) to service a single group-based communication channel, and each member of the group-based communication channel (reflective by associated client devices) is in communication with a single gateway server of the subset of gateway servers. As mentioned herein, alternative gateway server embodiments may be centrally-located computing devices corresponding with a centrally-located interface controller.

Moreover, "group-based communication channel servers" or "channel servers" as discussed herein with reference to certain embodiments are centrally-located computing devices configured for interacting with a plurality of gateway servers. In certain embodiments, all of the gateway servers within the subset of gateway servers servicing a single group-based communication channel communicate with a single channel server servicing the group-based communication channel. The channel servers provide an interface between the gateway servers and a storage location for storage and indexing of messages exchanged via the group-based communication channel. Examples of networked communication occurring between group-based communication channel servers, group-based communication gateway servers, group-based communication status checkers, and the like can be found in U.S. patent application Ser. No. 15/963,636, titled "Automated Load Distribution for a Group-based Communication Platform," filed Apr. 26, 2018, the contents of which are incorporated herein by reference in their entirety.

The "group-based communication edge cache host servers" as discussed with reference to various embodiments are geographically-distributed computing devices configured for providing an interface enabling efficient network communications between the individual client devices and respective group-based communication gateway servers within a group-based communication platform. In certain embodiments, a single group-based communication edge cache host server interacts with all of the gateway servers within a subset of gateway servers servicing a particular group-based communication channel. Moreover, the group-based communication edge cache host server may communicate with all of the available gateway servers to enable communications among and between any client devices of the group-based communications platform.

"Admin servers" or "group-based communication admin servers" as discussed herein with reference to certain embodiments are centrally-located computing devices configured for generating and/or maintaining a configuration key utilized by the gateway servers, channel servers, and/or group-based communication edge cache host servers for directing messages between and/or among the plurality of computing devices to support group-based communications between a plurality of client devices. The admin servers monitor health characteristics of the gateway servers, channel servers, and/or other admin servers, as determined based at least in part by a group-based communication status checker, and updates the configuration key to maintain healthy computing systems within a production environment supporting the group-based communications among client devices. The admin servers may be configured to provide updates to the configuration key stored in a separate memory storage device (e.g., associated with a group-based communication status checker) accessible to the gateway servers, channel servers, and/or admin servers (e.g., stored within and/or in association with the status checker), thereby enabling the computing devices to retrieve updated configuration keys once generated.

The "configuration key" as utilized herein is a data file that defines interactions between a plurality of computing entities. The configuration key comprises executable data usable by various computing entities (e.g., group-based communication edge cache host servers, gateway servers, channel servers, and/or the like) to request and/or establish communication connections with other, separate computing entities. As discussed herein, the configuration key may be accessible to group-based communication edge cache host servers, and utilized by those group-based communication edge cache host servers, to establish communication connections with one or more gateway servers to enable data transfer there between.

As mentioned, the configuration key may be stored in a memory storage device associated with one computing entity (e.g., a group-based communication status checker), but may be maintained by one of a plurality of second computing entities (e.g., admin servers). This configuration enables a plurality of second computing entities (in the alternative) to provide updates to a single configuration key that is implemented via the group-based communication platform. Thus, if one of the plurality of second computing entities fails, another of the plurality of second computing entities may update the configuration key if needed, thereby minimizing the impact of a failed computing entity on the overall functionality of the group-based communication platform.

As one of those second computing entities (e.g., admin servers) updates content within the configuration key, the admin server establishes a "lock" with the configuration key to prevent other computing entities (e.g., other admin servers) from accessing and/or modifying the configuration key simultaneously. Establishing the lock thereby ensures that only a single instance of the configuration key is maintained within the group-based communication platform to prevent conflicting configuration keys from being generated and/or passed to various computing entities. In instances in which a plurality of admin servers are available to update the configuration key, each of the plurality of admin servers may attempt to establish a lock simultaneously, but ultimately only a single admin server successfully establishes the lock, and that single admin server updates the configuration key as needed. Once the configuration key is updated, the admin server releases the lock, thereby enabling other computing entities (e.g., channel servers, gateway servers, group-based communication edge cache host servers, and/or the like) to retrieve the updated configuration key. Moreover, in certain embodiments the lock may be released prior to completion of an update to the configuration key, in instances in which the admin server fails after obtaining the lock, but before completion of the configuration key update. In such embodiments, the lock may be released by other admin servers, by the status checker, and/or by another computing entity.

The term "group-based communication data" refers to electronic data structures representing settings, parameters, group-based communication channels, group-based communication organizations, electronic interactions with a group-based communication platform, group-based communication channel/organization/team members, group-based communication messages (latest messages, direct messages), and the like.

The term "group-based communication data transmissions" refers to electronic transmissions of group-based communication data. In embodiments, the electronic transmissions of group-based communication data occur over a network.

The term "group-based communication load balancer" refers to a computing system configured to distribute workloads across the computing resources within a group-based communication platform. In embodiments, the group-based communication load balancer distributes client device connection and/or data requests across group-based communication edge cache hosts. In embodiments, the group-based communication load balancer utilizes HAProxy.

The term "client device connection request" refers to an electronic request transmitted by a client device or group-based communication load balancer to a group-based communication edge cache host server. In embodiments, the client device connection request comprises a client device authorization token by which, upon validation/verification, a user profile associated with the client device may be identified and retrieved.

The term "client device authorization token" refers to a digitally signed data structure utilized by a group-based communication server to verify the authenticity of a requesting client device. In embodiments, the client device authorization token is a JSON web token. A JSON Web Token consists of three parts: Header, Payload and Signature. The header and payload are Base64 encoded, then concatenated by a period, finally the result is algorithmically signed producing a token in the form of header.claims.signature. The header consists of metadata including the type of token and the hashing algorithm used to sign the token. The payload contains the claims data that the token is encoding.

The term "group-based communication data superset" refers to a complete set of group-based communication data associated with a particular user profile within a group-based communication platform. In embodiments, the complete set of group-based communication data associated with the particular user profile is stored in a group-based communication repository.

The term "group-based communication data subset" refers to a subset of group-based communication data that is extracted from a group-based communication data superset.

The term "group-based communication minimum data set" refers to a minimal set of group-based communication data set required by a client device to bootstrap a group-based communication interface.

The term "group-based communication interface" refers to an interface rendered on a client computing device for communication via a group-based communication platform (e.g. a cloud-based group collaboration tool provided by SLACK®).

The term "group-based communication status checker" refers to a computing entity configured to store contact, health and status information regarding group-based communication gateway servers and group-based communication channel servers. In embodiments, the group-based communication status checker includes a plurality of configuration keys as discussed above.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise an group-based communication server 106 in communication with at least one group-based communication repository 107. In embodiments, the group-based communication server 106 may comprise a configuration management service.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The group-based communication system or platform 105 may further comprise one or more group-based communication load balancers 108, one or more group-based communication edge cache host servers 109, one or more group-based communication status checkers 111, one or more group-based communication channel servers 112, and one or more group-based communication gateway servers 110. The one or more group-based communication load balancers 108, one or more group-based communication edge cache host servers 109, one or more group-based communication status checkers 111, one or more group-based communication channel servers 112, and one or more group-based communication gateway servers 110 are configured to support efficient distribution of group-based communication data transmissions along with the group-based communication server 106 and the group-based communication repository as described herein.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to an group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., an enterprise group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
        <timestamp>2020-12-31 23:59:59</timestamp>
        <user_accounts_details>
                <user_account_credentials>
                        <user_name>ID_user_1</user_name>
                        <password>abc123</password>
                        //OPTIONAL <cookie>cookieID</cookie>
                        //OPTIONAL <digital_cert_link>www.mydigitalcertificate.com/
JohnDoeDaDoeDoe@gmail.com/mycertifcate.dc</digital_cert_link>
                        //OPTIONAL <digital_certificate>_DATA_</digital_certificate>
                </user_account_credentials>
        </user_accounts_details>
        <client_details> //iOS Client with App and Webkit
```

```
            //it should be noted that although several client details
            //sections are provided to show example variants of client
            //sources, further messages will include only on to save
            //space
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>MSM.app</app_name>
            <app_version>1.0 </app_version>
            <app_webkit_name>Mobile Safari</client_webkit_name>
            <client_version>537.51.2</client_version>
        </client_details>
        <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
        </client_details>
        <client_details> //Android Client with Webbrowser
            <client_IP>10.0.0.123</client_IP>
            <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
            <client_product_type>Nexus S</client_product_type>
            <client_serial_number>YXXXXXXXXXZ</client_serial_number>
            <client_UDID>FXXXXXXXXX-XXXX-XXXX-XXXX-
XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details>//Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
            <client_product_type>MacPro5,1</client_product_type>
            <client_serial_number>YXXXXXXXXXZ</client_serial_number>
            <client_UDID>FXXXXXXXXX-XXXX-XXXX-XXXX-
XXXXXXXXXXXX</client_UDID>
            <client_OS>Mac OS X</client_OS>
            <client_O S_version>10.9.3</client_O S_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a copy our patent
policy.</contents>
            <attachments>patent_policy.pdf</attachments>
        </message>
</auth_request>
```

The group-based communication system 105 comprises at least one group-based communication server 106 that may create a storage message based upon the received message to facilitate message indexing and storage in an group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
        <message_identifier>ID_message_10</message_identifier>
        <team_identifier>ID_team_1<team_identifier>
        <channel_identifier>ID_channel_1<channel_identifier>
        <sending_user_identifier>ID_user_1<sending_user_identifier>
        <topics>
                <topic>inventions<topic>
                <topic>patents<topic>
                <topic>policies<topic>
        </topics>
        <responses>
                <response>liked by ID_user_2<response>
                <response>starred by ID_user_3<response>
        </responses>
        <contents>That is an interesting invention. I have attached a copy our patent policy.</contents>
        <attachments>patent_policy.pdf<attachments>
        <conversation_primitive>
                conversation includes messages: ID_message_8, ID_message_9, ID_message_10,
                ID_message_11, ID_message_12
        </conversation_primitive>
<storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the enterprise group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

Figure 2A:
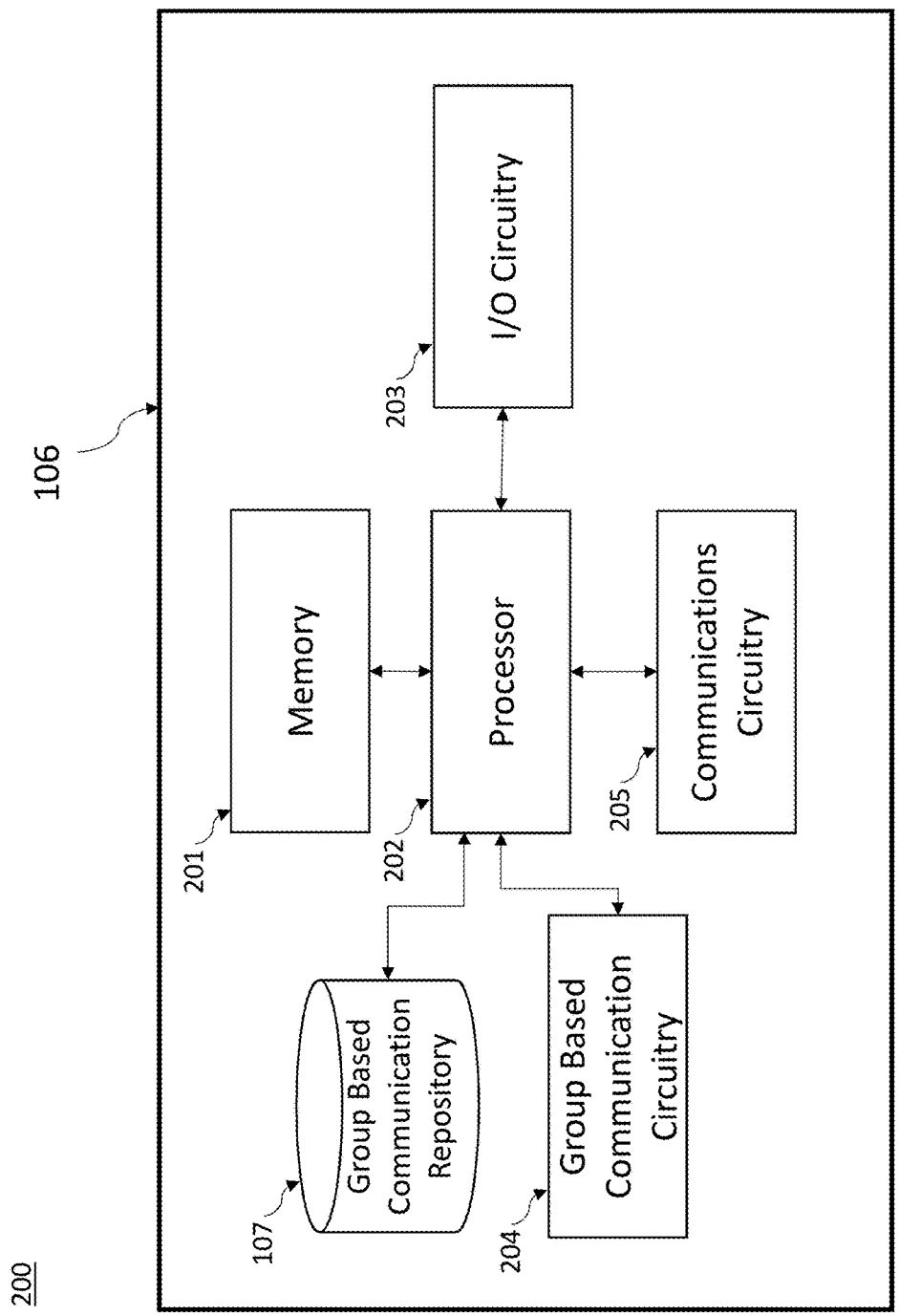

The group-based communication server 106 may be embodied by one or more computing systems, such as apparatus 200 shown in FIG. 2A. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

Figure 2B:
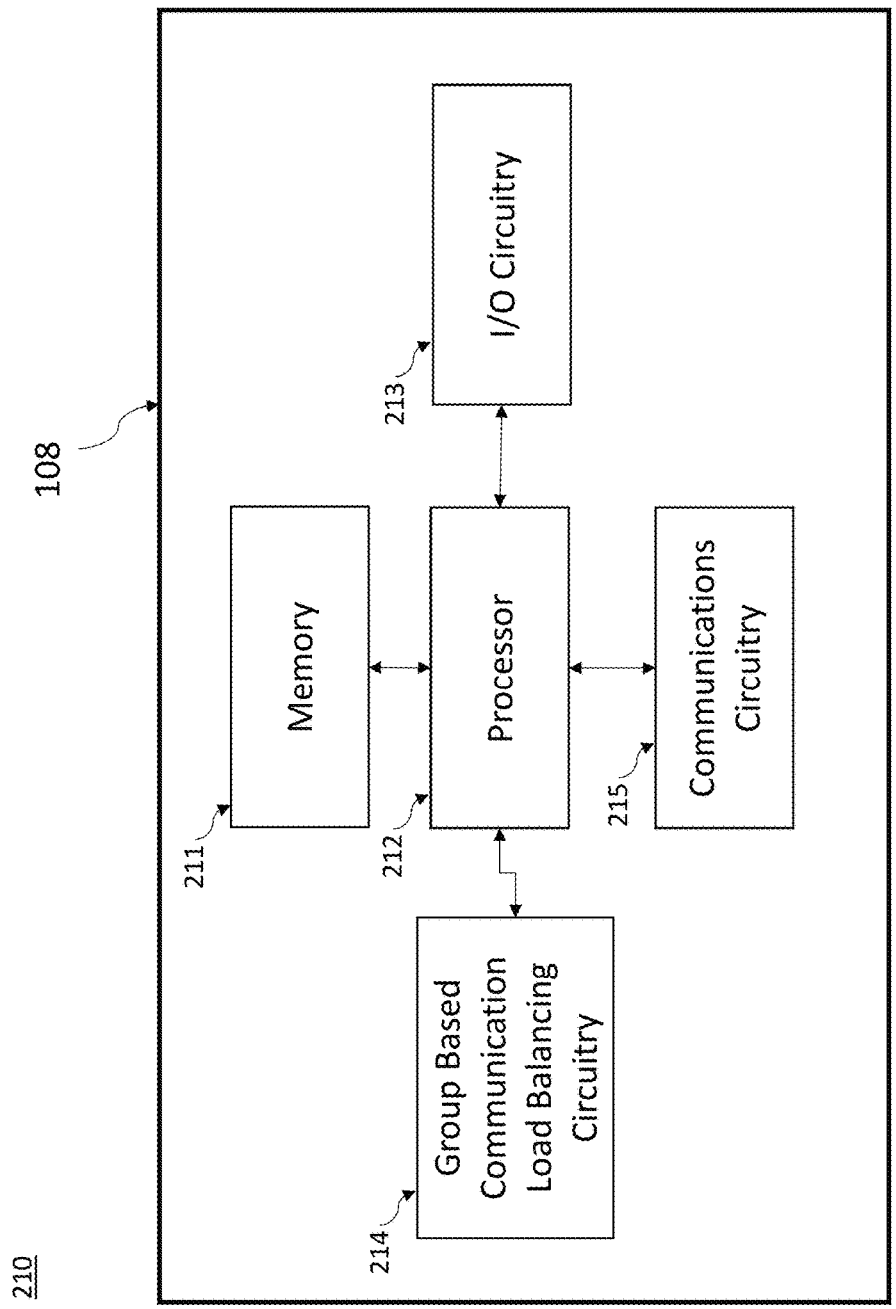

The one or more group-based communication load balancers 108 may be embodied by one or more computing systems, such as apparatus 210 shown in FIG. 2B. The apparatus 210 may include a processor 212, a memory 211, input/output circuitry 213, communications circuitry 215, and group-based communication load balancing circuitry 214. The apparatus 210 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 212 may provide processing functionality, the memory 211 may provide storage functionality, the communications circuitry 215 may provide network interface functionality, and the like.

In some embodiments, the processor 212 (and/or co-processor or any other processing circuitry assisting or otherwise associated with the processor) may be in communication with the memory 211 via a bus for passing information among components of the apparatus. The memory 211 may be non-transitory and may include, for example, one or more volatile and/or non-volatile memories. In other words, for example, the memory may be an electronic storage device (e.g., a computer readable storage medium). The memory 211 may be configured to store information, data, content, applications, instructions, or the like, for enabling the apparatus to carry out various functions in accordance with example embodiments of the present disclosure.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 210 may include input/output circuitry 213 that may, in turn, be in communication with processor 212 to provide output to the user and, in some embodiments, to receive an indication of a user input. The input/output circuitry 213 may comprise a user interface and may include a display and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be any means such as a device or circuitry embodied in either hardware or a combination of hardware and software that is configured to receive and/or transmit data from/to a network and/or any other device, circuitry, or module in communication with the apparatus 210. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication load balancing circuitry 214 includes hardware configured to support load balancing of client device connections within a group-based communication system. The group-based communication load balancing circuitry 214 may utilize processing circuitry, such as the processor 212, to perform these actions. It should also be appreciated that, in some embodiments, the group-based communication load balancing circuitry 214 may include a separate processor, specially configured field programmable gate array (FPGA), or application specific interface circuit (ASIC).

Figure 2C:
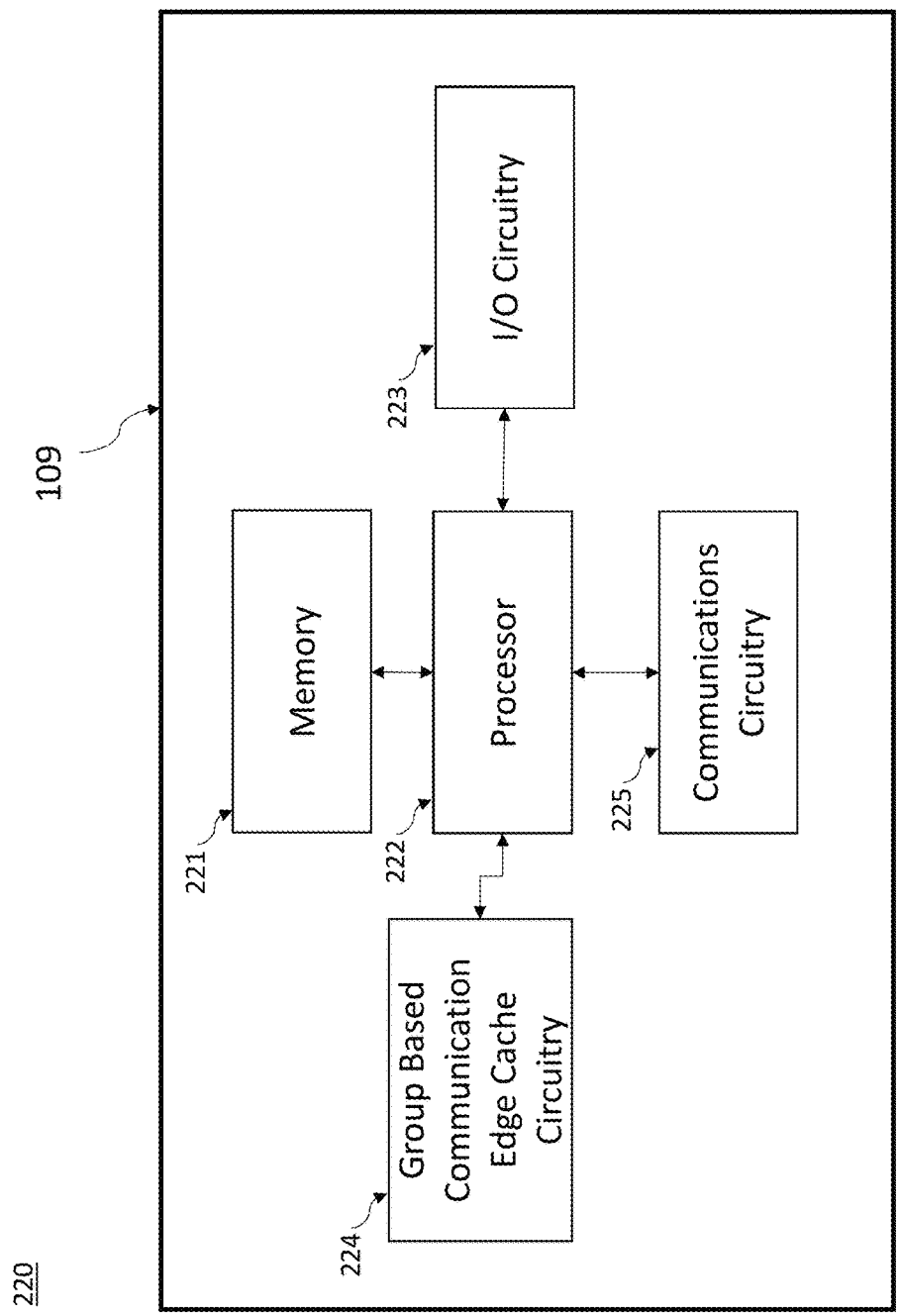

The one or more group-based communication edge cache host servers 109 may be embodied by one or more computing systems, such as apparatus 220 shown in FIG. 2C. The apparatus 220 may include a processor 222, a memory 221, input/output circuitry 223, communications circuitry 225, and group-based communication edge cache circuitry 224. The apparatus 220 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 220 may provide or supplement the functionality of particular circuitry. For example, the processor 222 may provide processing functionality, the memory 221 may provide storage functionality, the communications circuitry 225 may provide network interface functionality, and the like.

In some embodiments, the processor 222 (and/or co-processor or any other processing circuitry assisting or otherwise associated with the processor) may be in communication with the memory 221 via a bus for passing information among components of the apparatus. The memory 221 may be non-transitory and may include, for example, one or more volatile and/or non-volatile memories. In other words, for example, the memory may be an electronic storage device (e.g., a computer readable storage medium). The memory 221 may be configured to store information, data, content, applications, instructions, or the like, for enabling the apparatus to carry out various functions in accordance with example embodiments of the present disclosure.

The processor 222 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 222 may be configured to execute instructions stored in the memory 221 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 220 may include input/output circuitry 223 that may, in turn, be in communication with processor 222 to provide output to the user and, in some embodiments, to receive an indication of a user input. The input/output circuitry 223 may comprise a user interface and may include a display and may comprise a web user interface, a mobile application, a client device, a kiosk, or the like. In some embodiments, the input/output circuitry 223 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 221, and/or the like).

The communications circuitry 225 may be any means such as a device or circuitry embodied in either hardware or a combination of hardware and software that is configured to receive and/or transmit data from/to a network and/or any other device, circuitry, or module in communication with the apparatus 220. In this regard, the communications circuitry 225 may include, for example, a network interface for enabling communications with a wired or wireless communication network. For example, the communications circuitry 225 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication edge cache circuitry 224 includes hardware configured to support efficient network distribution of client device group-based communication data requests and transmission within a group-based communication system. The group-based communication edge cache circuitry 224 may utilize processing circuitry, such as the processor 222, to perform these actions. It should also be appreciated that, in some embodiments, the group-based communication edge cache circuitry 224 may include a separate processor, specially configured field programmable gate array (FPGA), or application specific interface circuit (ASIC).

Figure 2D:
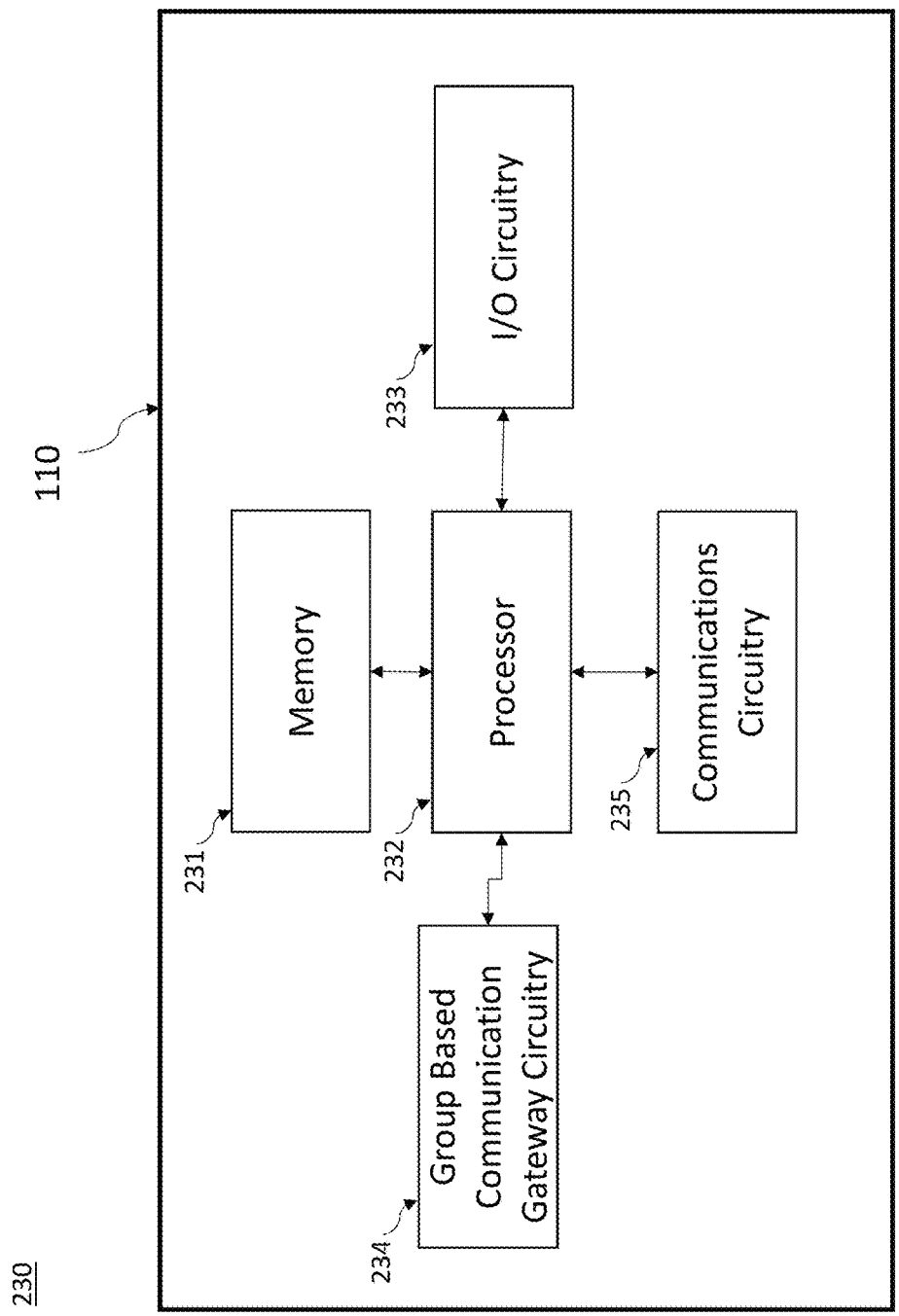

The one or more group-based communication gateway servers 110, may be embodied by one or more computing systems, such as apparatus 230 shown in FIG. 2D. The apparatus 230 may include a processor 232, a memory 231, input/output circuitry 233, communications circuitry 235, and group-based communication gateway circuitry 234. The apparatus 230 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 230 may provide or supplement the functionality of particular circuitry. For example, the processor 232 may provide processing functionality, the memory 231 may provide storage functionality, the communications circuitry 235 may provide network interface functionality, and the like.

In some embodiments, the processor 232 (and/or co-processor or any other processing circuitry assisting or otherwise associated with the processor) may be in communication with the memory 231 via a bus for passing information among components of the apparatus. The memory 231 may be non-transitory and may include, for example, one or more volatile and/or non-volatile memories. In other words, for example, the memory may be an electronic storage device (e.g., a computer readable storage medium). The memory 231 may be configured to store information, data, content, applications, instructions, or the like, for enabling the apparatus to carry out various functions in accordance with example embodiments of the present disclosure.

The processor 232 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 232 may be configured to execute instructions stored in the memory 231 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 230 may include input/output circuitry 233 that may, in turn, be in communication with processor 232 to provide output to the user and, in some embodiments, to receive an indication of a user input. The input/output circuitry 233 may comprise a user interface and may include a display and may comprise a web user interface, a mobile application, a client device, a kiosk, or the like. In some embodiments, the input/output circuitry 233 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 231, and/or the like).

The communications circuitry 235 may be any means such as a device or circuitry embodied in either hardware or a combination of hardware and software that is configured to receive and/or transmit data from/to a network and/or any other device, circuitry, or module in communication with the apparatus 230. In this regard, the communications circuitry 235 may include, for example, a network interface for enabling communications with a wired or wireless communication network. For example, the communications circuitry 235 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication gateway circuitry 234 includes hardware configured to support efficient network distribution of client device group-based communication data requests and transmission within a group-based communication system. The group-based communication gateway circuitry 234 may utilize processing circuitry, such as the processor 232, to perform these actions. It should also be appreciated that, in some embodiments, the group-based communication gateway circuitry 234 may include a separate processor, specially configured field programmable gate array (FPGA), or application specific interface circuit (ASIC).

Figure 2E:
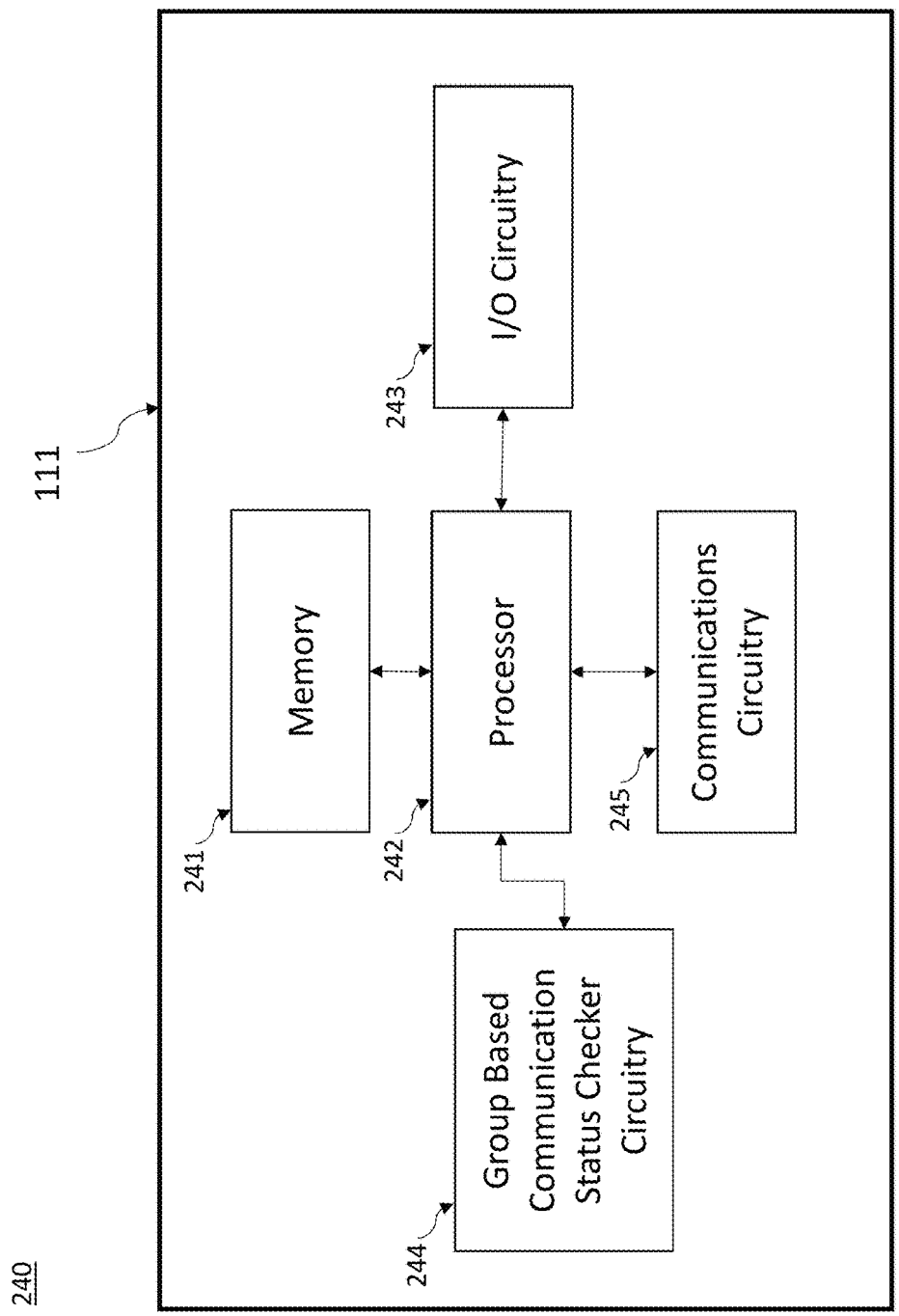

The one or more group-based communication status checkers 111, may be embodied by one or more computing systems, such as apparatus 240 shown in FIG. 2E. The apparatus 240 may include a processor 242, a memory 241, input/output circuitry 243, communications circuitry 245, and group-based communication status checker circuitry 244. The apparatus 240 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 240 may provide or supplement the functionality of particular circuitry. For example, the processor 242 may provide processing functionality, the memory 241 may provide storage functionality, the communications circuitry 245 may provide network interface functionality, and the like.

In some embodiments, the processor 242 (and/or co-processor or any other processing circuitry assisting or otherwise associated with the processor) may be in communication with the memory 241 via a bus for passing information among components of the apparatus. The memory 241 may be non-transitory and may include, for example, one or more volatile and/or non-volatile memories. In other words, for example, the memory may be an electronic storage device (e.g., a computer readable storage medium). The memory 241 may be configured to store information, data, content, applications, instructions, or the like, for enabling the apparatus to carry out various functions in accordance with example embodiments of the present disclosure.

The processor 242 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 242 may be configured to execute instructions stored in the memory 241 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 240 may include input/output circuitry 243 that may, in turn, be in communication with processor 242 to provide output to the user and, in some embodiments, to receive an indication of a user input. The input/output circuitry 243 may comprise a user interface and may include a display and may comprise a web user interface, a mobile application, a client device, a kiosk, or the like. In some embodiments, the input/output circuitry 243 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 241, and/or the like).

The communications circuitry 245 may be any means such as a device or circuitry embodied in either hardware or a combination of hardware and software that is configured to receive and/or transmit data from/to a network and/or any other device, circuitry, or module in communication with the apparatus 240. In this regard, the communications circuitry 245 may include, for example, a network interface for enabling communications with a wired or wireless communication network. For example, the communications circuitry 245 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication status checker circuitry 244 includes hardware configured to support efficient network distribution of client device group-based communication data requests and transmission within a group-based communication system. The group-based communication status checker circuitry 244 may utilize processing circuitry, such as the processor 242, to perform these actions. It should also be appreciated that, in some embodiments, the group-based communication status checker circuitry 244 may include a separate processor, specially configured field programmable gate array (FPGA), or application specific interface circuit (ASIC).

The one or more group-based communication channel servers 112 may be embodied by one or more computing systems, such as apparatus 250 shown in FIG. 2F. The apparatus 250 may include a processor 252, a memory 251, input/output circuitry 253, communications circuitry 255, and group-based communication channel circuitry 254. The apparatus 250 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 250 may provide or supplement the functionality of particular circuitry. For example, the processor 252 may provide processing functionality, the memory 251 may provide storage functionality, the communications circuitry 255 may provide network interface functionality, and the like.

In some embodiments, the processor 252 (and/or co-processor or any other processing circuitry assisting or otherwise associated with the processor) may be in communication with the memory 251 via a bus for passing information among components of the apparatus. The memory 251 may be non-transitory and may include, for example, one or more volatile and/or non-volatile memories. In other words, for example, the memory may be an electronic storage device (e.g., a computer readable storage medium). The memory 251 may be configured to store information, data, content, applications, instructions, or the like, for enabling the apparatus to carry out various functions in accordance with example embodiments of the present disclosure.

The processor 252 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 252 may be configured to execute instructions stored in the memory 251 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 250 may include input/output circuitry 253 that may, in turn, be in communication with processor 252 to provide output to the user and, in some embodiments, to receive an indication of a user input. The input/output circuitry 253 may comprise a user interface and may include a display and may comprise a web user interface, a mobile application, a client device, a kiosk, or the like. In some embodiments, the input/output circuitry 253 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 251, and/or the like).

The communications circuitry 255 may be any means such as a device or circuitry embodied in either hardware or a combination of hardware and software that is configured to receive and/or transmit data from/to a network and/or any other device, circuitry, or module in communication with the apparatus 250. In this regard, the communications circuitry 255 may include, for example, a network interface for enabling communications with a wired or wireless communication network. For example, the communications circuitry 255 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication channel circuitry 254 includes hardware configured to support efficient network distribution of client device group-based communication data requests and transmission within a group-based communication system. The group-based communication channel circuitry 254 may utilize processing circuitry, such as the processor 252, to perform these actions. It should also be appreciated that, in some embodiments, the group-based communication channel circuitry 254 may include a separate processor, specially configured field programmable gate array (FPGA), or application specific interface circuit (ASIC).

Example Processes for Efficient Distribution of Group-Based Communication Data

FIGS. 3A and 3B illustrate an exemplary data flow for retrieving a group-based communication data superset associated with a client device, according to one embodiment of the present disclosure. In embodiments, routine 300 begins with the electronic loading and executing of a group-based communication interface 301A on a client device. Routine 300 continues with the client device transmitting 301B a request for a connection (e.g., also including a request for group-based communication data) to a group-based communication load balancer. The group-based communication load balancer 301C determines which group-based communication edge cache host, from a plurality of group-based communication edge cache hosts, to connect the client device to.

In block 302, routine 300 continues with the group-based communication edge cache host receiving, using a processor and from the group-based communication load balancer, the client device connection request. In embodiments, the client device connection request is associated with a client device and comprises a client device authorization token.

In block 304, routine 300 continues with the group-based communication edge cache transmitting, using the processor and to a group-based communication server in communication with a group-based communication repository, the client device authorization token.

In block 306, routine 300 continues with the group-based communication edge cache receiving, using the processor and from the group-based communication server upon the group-based communication server verifying the client device authorization token (305), a first group-based communication data superset associated with the client device authorization token. In embodiments, the first group-based communication data superset includes all group-based communication data associated with the client device stored in the group-based communication repository. In embodiments, the group-based communication server retrieves (305) the first group-based communication data superset from a group-based communication repository.

In block 308, routine 300 continues with the group-based communication edge cache host storing, using the processor and in at least one memory, the first group-based communication data superset.

In block 310, routine 300 continues with the group-based communication edge cache extracting, using the processor, a first group-based communication data subset from the first group-based communication data superset. In embodiments, the first group-based communication data subset comprises a first group-based communication minimum data set required by the client device to render the group-based communication interface.

In block 312, routine 300 continues with transmitting, using the processor, the first group-based communication minimum data set to the client device.

In block 314, routine 300 continues with the client device utilizing the first group-based communication minimum data set to load and render the group-based communication interface.

FIGS. 4A and 4B illustrate an exemplary data flow for periodically receiving updated group-based communication data associated with a client device, according to one embodiment of the present disclosure.

In block 402, routine 400 begins with the group-based communication edge cache host receiving, using the processor and from the group-based communication gateway server, an updated group-based communication data set associated with the client device.

In block 404, routine 400 continues with the group-based communication edge cache updating, using the processor and in the at least one memory, the first group-based communication data superset with the updated group-based communication data set to produce an updated first group-based communication data superset.

FIGS. 5A and 5B illustrate an exemplary data flow for establishing a connection between a group-based communication edge cache host and a group-based communication gateway server, according to one embodiment of the present disclosure.

In a step 501, routine 500 begins with the group-based communication edge cache host requesting, from a group-based communication status checker, data representing a plurality of available group-based communication gateway servers.

In block 502, routine 500 continues with the group-based communication edge cache host receiving, using the processor and from a group-based communication status checker, data representing a plurality of available group-based communication gateway servers. In a step 503, the group-based communication edge cache host determines which group-based communication gateway server to connect to. In embodiments, the group-based communication edge cache host selects the group-based communication gateway server from the plurality of available group-based communication gateway servers based upon a group-based communication team identifier associated with the client device.

In block 504, routine 500 continues with the group-based communication edge cache establishing, using the processor, a connection with a group-based communication gateway server of the plurality of available group-based communication gateway servers. In embodiments, the group-based communication edge cache establishes a WebSocket connection to the group-based communication gateway server. In embodiments, the group-based communication edge cache hosts are in different geolocations from the group-based communication gateway servers.

In block 506, routine 500 continues with the group-based communication edge cache host receiving, using the processor and from the group-based communication gateway server, an updated group-based communication data set associated with the client device.

In block 508, routine 500 continues with the group-based communication edge cachet host updating, using the processor and in the at least one memory, the first group-based communication data superset with the updated group-based communication data set to produce an updated first group-based communication data superset.

FIGS. 6A and 6B illustrate an exemplary data flow for servicing a client device request for group-based communication data, according to one embodiment of the present disclosure.

In block 602, routine 600 begins with the group-based communication edge cache host receiving, using the processor and from the client device, a group-based communication data request.

In block 604, routine 600 continues with the group-based communication edge cache host extracting, using the processor and from the updated first group-based communication data superset, a second group-based communication data subset based on the group-based communication data request.

In block 606, routine 600 continues with the group-based communication edge cache host transmitting, using the processor, the second group-based communication data subset to the client device. In embodiments, the second group-based communication data subset is different from the first group-based communication data subset.

In embodiments, the first group-based communication data superset comprises all group-based communication data stored in the group-based communication repository associated with the client device. In embodiments, all group-based communication data stored in the group-based communication repository associated with the client device comprises group-based communication channel data associated with one or more group-based communication channel identifiers associated with the client device, group-based communication team data associated with one or more group-based communication team identifiers associated with the client device, and group-based communication channel member data associated with one or more members included in those group-based communication channels identified by the group-based communication channel identifiers associated with the client device.

Additional Implementation Details

Implementations of the subject matter and the functional operations described herein can be implemented in various types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method, comprising:
   receiving, using a processor and from a group-based communication load balancer, a client device connection request, the client device connection request associated with a client device and comprising a client device authorization token;
   transmitting, using the processor and to a group-based communication server in communication with a group-based communication repository, the client device authorization token;
   receiving, using the processor and from the group-based communication server upon the group-based communication server verifying the client device authorization token, a first group-based communication data superset associated with the client device authorization token;
   storing, using the processor and in at least one memory, the first group-based communication data superset;
   extracting, using the processor, a first group-based communication data subset from the first group-based communication data superset, the first group-based communication data subset comprising a first group-based communication minimum data set required by the client device to render a group-based communication interface; and
   transmitting, using the processor, the first group-based communication minimum data set to the client device.

2. The computer-implemented method of claim 1, further comprising:
   receiving, using the processor and from a group-based communication status checker, data representing a plurality of available group-based communication gateway servers;
   establishing, using the processor, a connection with a group-based communication gateway server of the plurality of available group-based communication gateway servers;
   receiving, using the processor and from the group-based communication gateway server, an updated group-based communication data set associated with the client device; and
   updating, using the processor and in the at least one memory, the first group-based communication data superset with the updated group-based communication data set to produce an updated first group-based communication data superset.

3. The computer-implemented method of claim 2, further comprising:
   receiving, using the processor and from the client device, a group-based communication data request;
   extracting, using the processor and from the updated first group-based communication data superset, a second group-based communication data subset based on the group-based communication data request; and
   transmitting, using the processor, the second group-based communication data subset to the client device.

4. The computer-implemented method of claim 3, wherein the second group-based communication data subset is different from the first group-based communication data subset.

5. The computer-implemented method of claim 2, further comprising:
   selecting, using the processor, the group-based communication gateway server from the plurality of available group-based communication gateway servers based upon a group-based communication team identifier associated with the client device.

6. The computer-implemented method of claim 1, wherein the first group-based communication data superset comprises all group-based communication data stored in the group-based communication repository associated with the client device.

7. The computer-implemented method of claim 6, wherein all group-based communication data stored in the group-based communication repository associated with the client device comprises:
   group-based communication channel data associated with one or more group-based communication channel identifiers associated with the client device;
   group-based communication team data associated with one or more group-based communication team identifiers associated with the client device; and
   group-based communication channel member data associated with one or more members included in those group-based communication channels identified by the group-based communication channel identifiers associated with the client device.

8. The computer-implemented method of claim 1, wherein the group-based communication server retrieves the first group-based communication data superset from the group-based communication repository.

9. A computing apparatus for implementing a group-based communication edge cache host, the computing apparatus comprising:
   a processor; and
   a memory storing instructions that, when executed by the processor, configure the apparatus to:
   receive, from a group-based communication load balancer, a client device connection request, the client device connection request associated with a client device and comprising a client device authorization token;
   transmit, to a group-based communication server in communication with a group-based communication repository, the client device authorization token;
   receive, from the group-based communication server upon the group-based communication server verifying the client device authorization token, a first group-based communication data superset associated with the client device authorization token;
   store, in at least one memory, the first group-based communication data superset;
   extract a first group-based communication data subset from the first group-based communication data superset, the first group-based communication data subset comprising a first group-based communication minimum data set required by the client device to render a group-based communication interface; and transmit the first group-based communication minimum data set to the client device.

10. The computing apparatus of claim 9, wherein the instructions further configure the apparatus to:

receive, using the processor and from a group-based communication status checker, data representing a plurality of available group-based communication gateway servers;

establish, using the processor, a connection with a group-based communication gateway server of the plurality of available group-based communication gateway servers;

receive, using the processor and from the group-based communication gateway server, an updated group-based communication data set associated with the client device; and update, using the processor and in the memory storing instructions, the first group-based communication data superset with the updated group-based communication data set to produce an updated first group-based communication data superset.

11. The computing apparatus of claim 10, wherein the instructions further configure the apparatus to:

receive, using the processor and from the client device, a group-based communication data request;

extract, using the processor and from the updated first group-based communication data superset, a second group-based communication data subset based on the group-based communication data request; and transmit, using the processor, the second group-based communication data subset to the client device.

12. The computing apparatus of claim 11, wherein the second group-based communication data subset is different from the first group-based communication data subset.

13. The computing apparatus of claim 10, wherein the instructions further configure the apparatus to:

select, using the processor, the group-based communication gateway server from the plurality of available group-based communication gateway servers based upon a group-based communication team identifier associated with the client device.

14. The computing apparatus of claim 10, wherein the computing apparatus is located in a different geolocation than the group-based communication gateway server and the group-based communication server.

15. The computing apparatus of claim 9, wherein the first group-based communication data superset comprises all group-based communication data stored in the group-based communication repository associated with the client device.

16. The computing apparatus of claim 15, wherein all group-based communication data stored in the group-based communication repository associated with the client device comprises:

group-based communication channel data associated with one or more group-based communication channel identifiers associated with the client device;

group-based communication team data associated with one or more group-based communication team identifiers associated with the client device; and group-based communication channel member data associated with one or more members included in those group-based communication channels identified by the group-based communication channel identifiers associated with the client device.

17. The computing apparatus of claim 9, wherein the group-based communication server retrieves the first group-based communication data superset from the group-based communication repository.

18. A group-based communication edge cache host system, comprising one or more servers, each server comprising a processor and memory storing instructions that, when executed by the processor, cause the server to:

receive, from a group-based communication load balancer, a client device connection request, the client device connection request associated with a client device and comprising a client device authorization token;

transmit, to a group-based communication server in communication with a group-based communication repository, the client device authorization token;

receive, from the group-based communication server upon the group-based communication server verifying the client device authorization token, a first group-based communication data superset associated with the client device authorization token;

store, in at least one memory, the first group-based communication data superset;

extract a first group-based communication data subset from the first group-based communication data superset, the first group-based communication data subset comprising a first group-based communication minimum data set required by the client device to render a group-based communication interface; and transmit the first group-based communication minimum data set to the client device.

* * * * *